US012612070B2

(12) United States Patent
Hong

(10) Patent No.: US 12,612,070 B2
(45) Date of Patent: Apr. 28, 2026

(54) AUTOMATIC DRIVING CONTROL APPARATUS AND METHOD THEREOF

(71) Applicants: Hyundai Motor Company, Seoul (KR); Kia Corporation, Seoul (KR)

(72) Inventor: Jeung Sik Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 168 days.

(21) Appl. No.: 18/612,053

(22) Filed: Mar. 21, 2024

(65) Prior Publication Data

US 2025/0010881 A1 Jan. 9, 2025

(30) Foreign Application Priority Data

Jul. 5, 2023 (KR) ........................ 10-2023-0087215

(51) Int. Cl.
*B60W 60/00* (2020.01)
*B60W 50/00* (2006.01)
*B60W 50/06* (2006.01)

(52) U.S. Cl.
CPC .......... *B60W 60/001* (2020.02); *B60W 50/06* (2013.01); *B60W 2050/0083* (2013.01); *B60W 2552/00* (2020.02); *B60W 2556/40* (2020.02)

(58) Field of Classification Search
CPC ............... B60W 60/001; B60W 50/06; B60W 2050/0083; B60W 2552/00; B60W 2556/40; G01C 21/3859; G01C 21/3863; G01C 21/3885; G01C 21/3815
See application file for complete search history.

(56) References Cited

U.S. PATENT DOCUMENTS

| | | | | |
|---|---|---|---|---|
| 2009/0177706 A1* | 7/2009 | Takahata | ....................... | 707/200 |
| 2009/0216771 A1* | 8/2009 | Nakamura | .............. | G06F 17/30 707/10 |
| 2012/0084002 A1* | 4/2012 | Matsunaga | ........ | G01C 21/3878 707/E17.014 |
| 2012/0143402 A1* | 6/2012 | Kim | ........................ | G06F 17/00 701/2 |
| 2016/0047658 A1* | 2/2016 | Nishide | .................. | G01C 21/26 |
| 2019/0121798 A1* | 4/2019 | Schechter | ........... | G06F 16/2358 |

FOREIGN PATENT DOCUMENTS

WO WO2023090203 A1 * 5/2023 ............ B60W 30/10

* cited by examiner

*Primary Examiner* — Russell Frejd
*Assistant Examiner* — Brittany Renee Peko
(74) *Attorney, Agent, or Firm* — MORGAN, LEWIS & BOCKIUS LLP

(57) ABSTRACT

An automatic driving control apparatus is provided. The automatic driving control apparatus includes a memory storing computer-executable instructions, a communication device that assists in communicating with a server, and at least one processor that accesses the memory and executes the instructions. The at least one processor is configured to determine information included in a road link file corresponding to a target section as entity information, alignment information, or location information, receives target information different from the information included in the road link file among pieces of information included in a server road link file which is stored in the server and corresponds to the target section from the server, recognizes a header of the received target information and updates the road link file, and control a vehicle based on updating the road link file.

20 Claims, 8 Drawing Sheets

AUTOMATIC DRIVING CONTROL APPARATUS
100

PROCESSOR
110

MEMORY
120

INSTRUCTIONS
122

COMMUNICATION DEVICE
130

SERVER
140

420 — SECTION A ROAD LINK INFORMATION

| ENTITY INFORMATION (422) | | ALIGNMENT INFORMATION (424) | | LOCATION INFORMATION (426) | |
|---|---|---|---|---|---|
| A1 | STRAIGHT MARK 1 | | | A1.0.1 | LOCATION VALUE OF EACH EDGE |
| A2 | STRAIGHT MARK 2 | | | A2.0.1 | LOCATION VALUE OF EACH EDGE |
| A3 | U-TURN MARK | | | A3.0.1 | LOCATION VALUE OF EACH EDGE |
| A4 | CROSSWALK MARK | | | A4.0.1 | LOCATION VALUE OF EACH EDGE |
| A5 | SIGN | A5.1 | INTERPOLATION POINTS 1,2,3,4,5 | A5.0.1 | LOCATION VALUE OF EACH EDGE |
| A6 | ROAD BOUNDARY 1 | | | A6.0.1 | LOCATION VALUE OF EACH EDGE |
| A7 | LINE 1 | A7.1 | INTERPOLATION POINTS 1,2,3,4,5 | A7.1.1 | LOCATION VALUE OF EACH EDGE |
| A8 | MEDIAN STRIP | A8.1 | INTERPOLATION POINTS 1,2,3,4,5 | A8.1.1 | LOCATION VALUE OF EACH EDGE |
| A9 | LINE 2 | A9.1 | INTERPOLATION POINTS 1,2,3,4,5 | A9.1.1 | LOCATION VALUE OF EACH EDGE |
| A10 | ROAD BOUNDARY 2 | A10.1 | INTERPOLATION POINTS 1,2,3,4,5 | A10.1.1 | LOCATION VALUE OF EACH EDGE |
| A11 | SPEED SIGN | | | A11.1.1 | LOCATION VALUE OF EACH EDGE |
| A12 | GUIDE SIGN | | | A12.1.1 | LOCATION VALUE OF EACH EDGE |

430 — SECTION B ROAD LINK INFORMATION

| ENTITY INFORMATION | | ALIGNMENT INFORMATION | | LOCATION INFORMATION | |
|---|---|---|---|---|---|
| B1 | XXXX | B1.1 | XXXX | B1.1.1 | XXXX |
| ... | | ... | | ... | |

440 — SECTION C ROAD LINK INFORMATION

| ENTITY INFORMATION | | ALIGNMENT INFORMATION | | LOCATION INFORMATION | |
|---|---|---|---|---|---|
| C1 | XXXX | C1.1 | XXXX | C1.1.1 | XXXX |
| ... | | ... | | ... | |

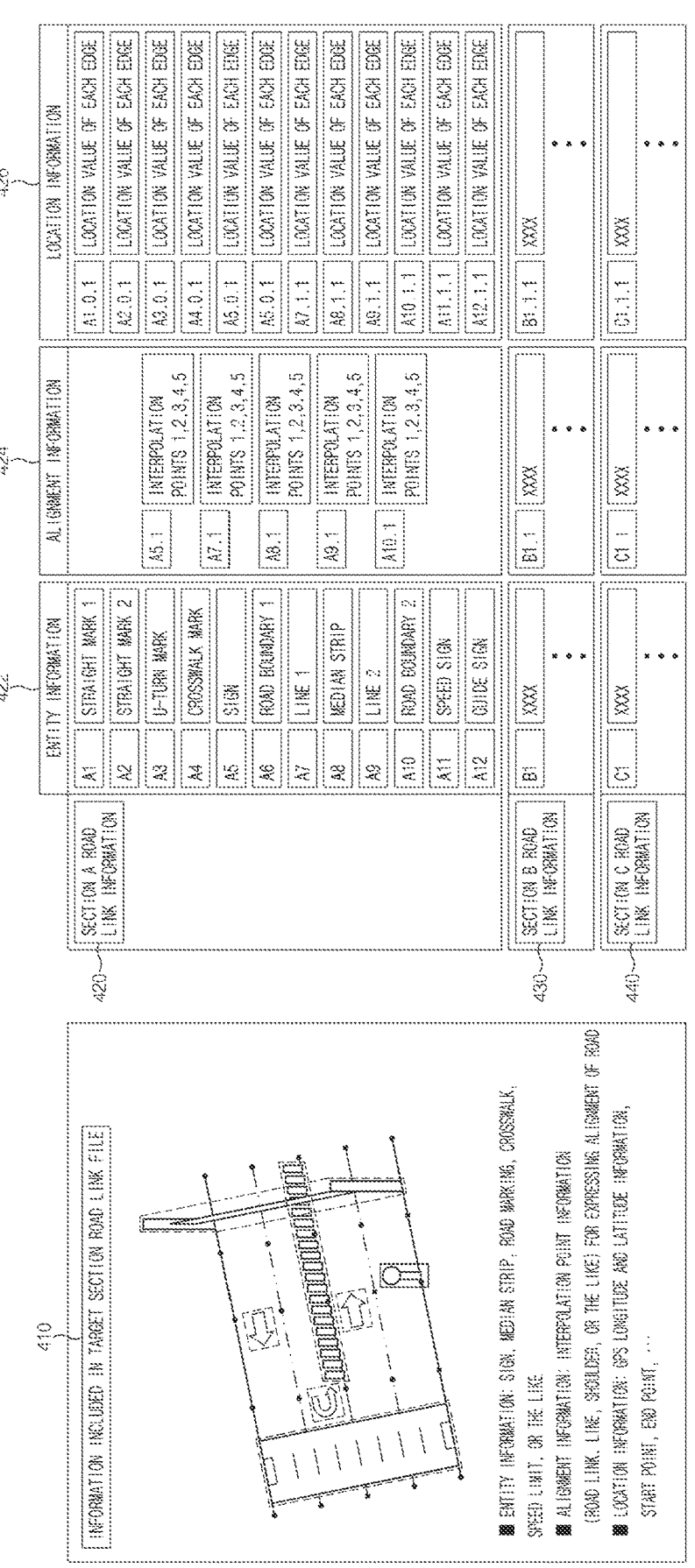

410 — INFORMATION INCLUDED IN TARGET SECTION ROAD LINK FILE

- ENTITY INFORMATION: SIGN, MEDIAN STRIP, ROAD MARKING, CROSSWALK, SPEED LIMIT, OR THE LIKE
- ALIGNMENT INFORMATION: INTERPOLATION POINT INFORMATION (ROAD LINK, LINE, SHOULDER, OR THE LIKE) FOR EXPRESSING ALIGNMENT OF ROAD
- LOCATION INFORMATION: GPS LONGITUDE AND LATITUDE INFORMATION, START POINT, END POINT, ...

AUTOMATIC DRIVING CONTROL APPARATUS AND METHOD THEREOF

CROSS-REFERENCE TO RELATED APPLICATION

The present application claims priority to Korean Patent Application No. 10-2023-0087215, filed on Jul. 5, 2023, the entire contents of which is incorporated herein for all purposes by this reference.

BACKGROUND OF THE PRESENT DISCLOSURE

Field of the Present Disclosure

The present disclosure relates to an automatic driving control apparatus and a method thereof, and more particularly, relates to technologies of updating changed information in a portion of a road link file corresponding to a target section.

Description of Related Art

Map information may be configured by binding entity information, alignment information, and location information in a form of each information for one entity (e.g., a road link, a line, a median strip, or the like) and is updated per changed entity when updated.

The map information includes limited-access roads (including highways) of about 16,000 km in Korea and is displayed as map data by configuring a file for each road link and reading the road link file.

To update the above-mentioned map data, map data divided for each road link should be updated for changed, newly established, or closed sections.

However, it is correct to add all pieces of information (e.g., entity information, location information, and alignment information) included in road link data for the newly established road. However, there are limitations in needing to update all road link files although only partial information is changed. There is a demand for a technology for addressing it.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an automatic driving control apparatus for determining information included in a road link file corresponding to a target section as entity information, alignment information, or location information and generating an entity road link file including the entity information, alignment road link file including alignment information, and a location road link file including the location information and a method thereof.

Another aspect of the present disclosure provides an automatic driving control apparatus for comparing pieces of information included in a server road link file which is stored in a server and corresponds to the target section with information included in the road link file and receiving target information identified as being different from the information included in the road link file among the pieces of information included in the server road link file from the server and a method thereof.

Another aspect of the present disclosure provides an automatic driving control apparatus for recognizing a header of the received target information and updating at least one of the entity road link file, the alignment road link file, or the location road link file, or any combination thereof and a method thereof.

Another aspect of the present disclosure provides an automatic driving control apparatus for calling headers of pieces of information included in the target section and a section different from the target section and generating map data based on the called headers to generate high-definition map data and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an automatic driving control apparatus may include a memory storing computer-executable instructions, a communication device that assists in communicating with a server, and at least one processor that accesses the memory and executes the instructions. The at least one processor is configured to determine information included in a road link file corresponding to a target section as entity information, alignment information, or location information, may receive target information different from the information included in the road link file among pieces of information included in a server road link file which is stored in the server and corresponds to the target section from the server, may recognize a header of the received target information and updates the road link file, and may control a vehicle based on updating the road link file.

In an exemplary embodiment of the present disclosure, the entity information may include a combination of at least one of guide sign information, speed sign information, median strip information, road direction information, or crosswalk information, or any combination thereof.

In an exemplary embodiment of the present disclosure, the alignment information may include interpolation point information for expressing an alignment of a road.

In an exemplary embodiment of the present disclosure, the location information may include at least one of global positioning system (GPS) longitude and latitude information of the entity information, start point information of the entity information, or end point information of the entity information, or any combination thereof.

In an exemplary embodiment of the present disclosure, the at least one processor is configured to generate an entity road link file including the entity information, an alignment road link file including the alignment information, and a location road link file including the location information and may recognize the header of the received target information and updates at least one of the entity road link file, the alignment road link file, or the location road link file, or any combination thereof.

In an exemplary embodiment of the present disclosure, the at least one processor may recognize the header of the target information and may extract information corresponding to the recognized header among pieces of information included in the at least one of the entity road link file, the alignment road link file, or the location road link file, or the any combination thereof and may replace the extracted information with the target information in the at least one of the entity road link file, the alignment road link file, or the location road link file, or the any combination thereof.

In an exemplary embodiment of the present disclosure, the at least one processor may delete the extracted information from the automatic driving control apparatus, on the basis that the extracted information is replaced with the target information.

In an exemplary embodiment of the present disclosure, the at least one processor may delete the target information from the automatic driving control apparatus, on the basis that the extracted information is not replaced with the target information.

In an exemplary embodiment of the present disclosure, the at least one processor may call headers of pieces of information included in each of the entity road link file, the alignment road link file, and the location road link file and may be configured to generate map data of the target section, based on the called headers.

In an exemplary embodiment of the present disclosure, the at least one processor may call headers of pieces of information included in each of an entity road link file, an alignment road link file, and a location road link file of a section different from the target section, may be configured to generate map data of the section different from the target section, based on the called headers, and may be configured to generate high-definition map data, based on the map data of the target section and the map data of the section different from the target section.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a drawing illustrating an example of determining entity information, alignment information, and location information for controlling automatic driving according to an exemplary embodiment of the present disclosure;

Figure 1:
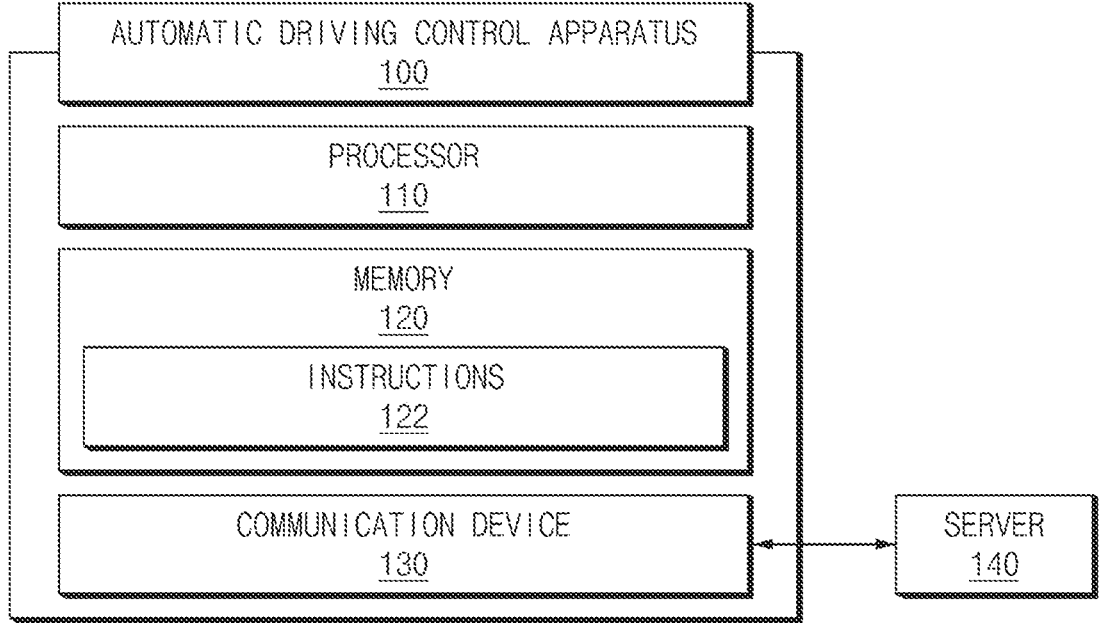
FIG. 1 is a drawing illustrating an automatic driving control apparatus and a server according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In the drawings, the same reference numerals will be used throughout to designate the same or equivalent elements. Furthermore, a detailed description of well-known features or functions will be ruled out in order not to unnecessarily obscure the gist of the present disclosure. Hereinafter, various embodiments of the present disclosure may be described with reference to the accompanying drawings. However, it should be understood that this is not intended to limit the present disclosure to specific implementation forms and includes various modifications, equivalents, and/or alternatives of embodiments of the present disclosure. With regard to description of drawings, similar components may be marked by similar reference numerals.

In describing elements of exemplary embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which the present disclosure belongs. It will be understood that terms used herein should be interpreted as having a meaning which is consistent with their meaning in the context of the present disclosure and the relevant art and will not be interpreted in an idealized or overly formal sense unless so defined herein. For example, the terms, such as "first", "second", "1st", "2nd", or the like used in an exemplary embodiment of the present disclosure may be used to refer to various components regardless of the order and/or the priority and to distinguish one component from another component, but do not limit the components. For example, a first user device and a second user device indicate different user devices, irrespective of the order and/or priority. For example, without departing the scope of the present disclosure, a first component may be referred to as a second component, and similarly, a second component may be referred to as a first component.

In an exemplary embodiment of the present disclosure, the expressions "have", "may have", "include" and "comprise", or "may include" and "may comprise" indicate existence of corresponding features (e.g., components such as numeric values, functions, operations, or parts), but do not exclude presence of additional features.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in an exemplary embodiment of the present disclosure may be used exchangeably with, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to perform A, B, and C" may mean a generic-purpose processor (e.g., a central processing unit (CPU) or an application processor) which may perform corresponding operations by executing one or more software programs which store a dedicated processor (e.g., an embedded processor) for performing a corresponding operation or a memory device.

Terms used in an exemplary embodiment of the present disclosure are used to describe specified embodiments and are not intended to limit the scope of another exemplary embodiment of the present disclosure. The terms of a singular form may include plural forms unless the context clearly indicates otherwise. All the terms used herein, which include technical or scientific terms, may have the same meaning which is generally understood by a person skilled in the art described in an exemplary embodiment of the present disclosure. It will be further understood that terms, which are defined in a dictionary and commonly used, should also be interpreted as is customary in the relevant related art and not in an idealized or overly formal sense unless so defined herein in various embodiments of the present disclosure. In some cases, even though terms are terms which are defined in the specification, they may not be interpreted to exclude embodiments of the present disclosure.

In an exemplary embodiment of the present disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included. Furthermore, in describing an exemplary embodiment of the present disclosure, each of such phrases as "A or B", "at least one of A and B", "at least one of A or B", "A, B, or C", "at least one of A, B, and C", "at least one of A, B, or C", and "at least one of A, B, or C, or any combination thereof" may include any one of, or all possible combinations of the items enumerated together in a corresponding one of the phrases. The phrase such as "at least one of A, B, or C, or any combination thereof" may include "A", "B", or "C", or "AB" or "ABC", which is a combination thereof.

Hereinafter, various exemplary embodiments of the present disclosure will be described in detail with reference to FIG. 1, FIG. 2, FIG. 3, FIG. 4, FIG. 5, FIG. 6, FIG. 7, and FIG. 8.

FIG. 1 is a drawing illustrating an automatic driving control apparatus and a server according to an exemplary embodiment of the present disclosure.

An automatic driving control apparatus 100 according to various exemplary embodiments of the present disclosure may include a processor 110, a memory 120 storing instructions 122, and a communication device 130.

The automatic driving control apparatus 100 may indicate an apparatus which updates a map for vehicle for autonomous driving of a vehicle. For example, the map for vehicle may include a navigation map, an advanced driver assistance system (ADAS) map, and a high-definition map. For convenience of description in the specification, the above-mentioned map for vehicle is mainly referred to as the high-definition map.

The high-definition map may indicate a map on which boundaries on roads, lines on the roads, and pieces of information related to various facilities are displayed in detail in predetermined units. For example, the high-definition map may indicate information related to which road and which lane the vehicle is traveling on in real time. Furthermore, the high-definition map may provide a user of the vehicle with a boundary of the road (e.g., a centerline and a boundary line of the road), information for each line, traffic lights, a crosswalk, a sign, a road surface mark, and the like as three-dimensional (3D) graphic elements, thus being expected to include the effect of allowing an autonomous vehicle to drive stably even in inclement weather or an emergency situation due to a failure in a sensor of the vehicle.

The high-definition map may include at least one unit section map. For example, the unit section map may indicate a map for a road in a unit section divided by a predetermined length on a limited-access road. The unit section map may be stored as a road link file. A detailed description about the road link will be provided below in detail with reference to FIG. 2.

The automatic driving control apparatus 100 may update a high-definition map which is a map for vehicle. For example, the automatic driving control apparatus 100 may update a unit section map required to change among unit section maps included in the high-definition map. In detail, the automatic driving control apparatus 100 may update a road link file indicating a unit section map to update the high-definition map. Furthermore, although described below in detail with reference to FIG. 4, the automatic driving control apparatus 100 may update at least one of an entity road link file, an alignment road link file, or a location road link file, or any combination thereof, rather than the road link file, to update the high-definition map. As a result, the automatic driving control apparatus 100 may update only a portion which needs to change in the unit section map and may not update other pieces of information which do not need to be updated, thus being expected to an effect of reducing capacity and time unnecessary to update the map. The method for updating the high-definition map will be given below in detail with reference to FIG. 5.

The processor 110 may execute software and may be configured for controlling at least one other component (e.g., a hardware or software component) connected to the processor 110. Furthermore, the processor 110 may perform a variety of data processing or determination. For example, the processor 110 may store an entity road link file, an alignment road link file, and a location road link file, which are generated by determining information included in the road link file, in the memory 120, the processor 110 may recognize a header of target information received from a server 140 by a method for controlling and updating a high-definition map, which will be described below with reference to FIG. 5, and may update at least one of the entity road link file, the alignment road link file, or the location road link file, or any combination thereof.

The memory 120 may temporarily and/or permanently store various pieces of data and/or information required to control the high-definition map. For example, the memory 120 may store at least one of the road link file, the entity road link file, the alignment road link file, the location road link file, the target information received from the server 140, or information which corresponds to the header of the target information and is extracted from the entity road link file, the alignment road link file, and the location road link file, or any combination thereof.

The communication device 130 may assist in performing communication between the automatic driving control apparatus 100 and the server 140. For example, the communication device 130 may include one or more components for performing communication between the automatic driving control apparatus 100 and the server 140. For example, the communication device 130 may include a short range wireless communication unit, a long range wireless communication unit, a microphone, or the like.

In the instant case, a short range communication technology may be, but is not limited to, a wireless local area network (Wi-Fi), Bluetooth, ZigBee, Wi-Fi Direct (WFD), ultra-wideband (UWB), infrared data association (IrDA), Bluetooth low energy (BLE), Near Field Communication (NFC), or the like. A long range communication technology may be, but is not limited to, a wireless local area network (WLAN), code-division multiple access (CDMA), global system for mobile communications (GSM), 3G (third generation of wireless mobile telecommunications technology), 4G (fourth generation of wireless mobile telecommunications technology), 5G (fifth generation of wireless mobile telecommunications technology), satellite communication, or the like.

The server 140 may indicate a server configured for providing information updated in the high-definition map. For example, when receiving a current map version from the automatic driving control apparatus 100, the server 140 may transmit a road link file associated with the current map version to the automatic driving control apparatus 100. A detailed description about the information transmitted and received by the automatic driving control apparatus 100 and the server 140 will be given below with reference to FIG. 5.

Figure 2:
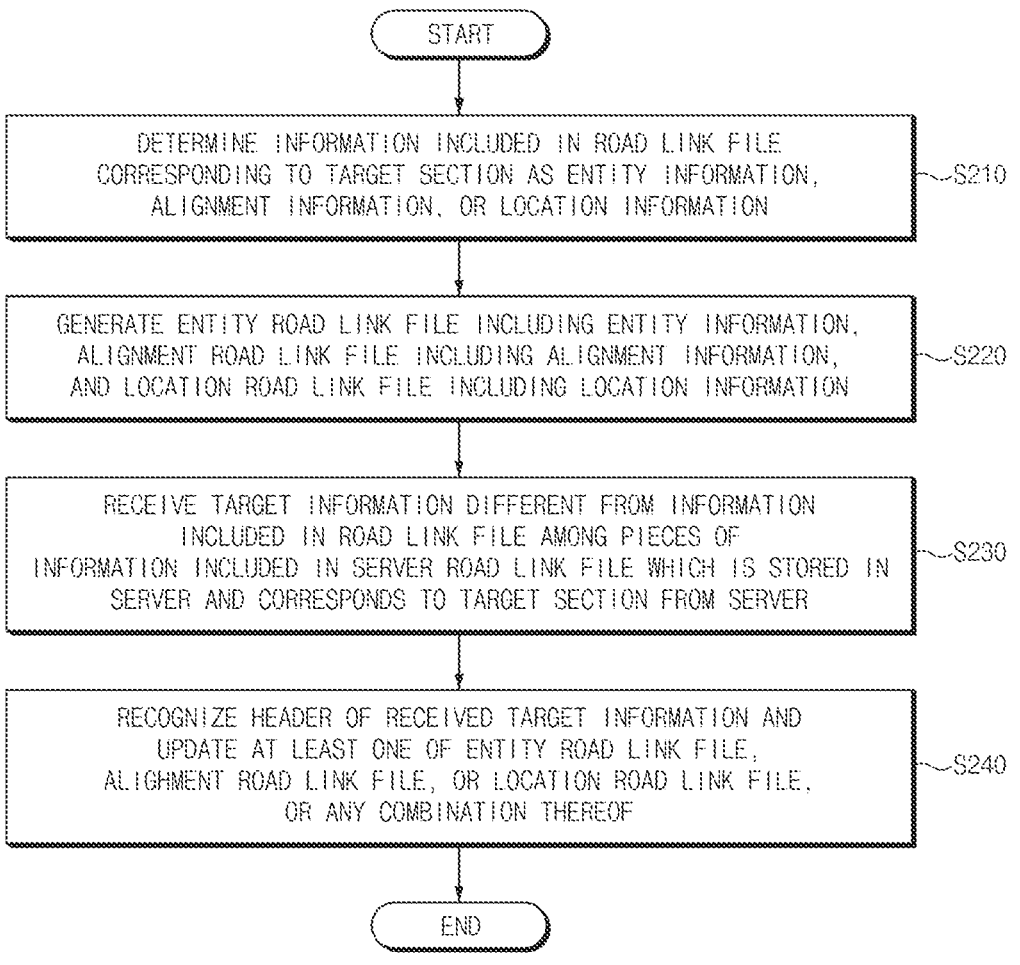
FIG. 2 is a flowchart for describing a method for controlling automatic driving according to an exemplary embodiment of the present disclosure.

FIG. 2 is a flowchart for describing a method for controlling a high-definition map according to an exemplary embodiment of the present disclosure.

In S210, an automatic driving control apparatus (e.g., an automatic driving control apparatus 100 of FIG. 1) may be configured to determine information included in a road link file corresponding to a target section as entity information, alignment information, or location information.

A road link may indicate map configuration information expressed and included in a high-definition map. For example, the road link may include a component of the map indicating at least one of a centerline of the road, a boundary line of the road, a line of the road, traffic lights, a crosswalk, a sign, or a road surface mark, or any combination thereof.

The road link file may indicate a file including map configuration information expressed and included in the high-definition map. The information included in the road link file may include information related to a boundary of the road (e.g., the centerline and the boundary line of the road), information for each line, traffic light information, crosswalk information, sign information, and road surface mark information.

The target section may indicate a section connecting any first point with any second point in the entire road section indicating the high-definition map. For example, the target section may include a section connecting any first point with the second point different from the first point in the entire road indicating the high-definition map. The section different from the target section may include a section connecting any two points different from the first point and the second point, in a section except for the target section in the entire road section indicating the high-definition map.

The information included in the road link file corresponding to the target section may indicate a file including map configuration information expressed or included in the section connecting any first point with any second point in the entire road section indicating the high-definition map.

The entity information may indicate pieces of information of entities included in the high-definition map. For example, the entity information may include a combination of at least one of guide sign information, speed sign information, median strip information, road direction information, or crosswalk information, or any combination thereof.

The alignment information may indicate pieces of information of road alignments included in the high-definition map. For example, the alignment information may include interpolation point information for expressing an alignment of the road. The interpolation point information may indicate information related to a point which is a criterion of a curve for expressing the alignment of the road.

The location information may indicate information related to locations of entities included in the high-definition map. For example, the location information may include at least one of global positioning system (GPS) longitude and latitude information of entity information, start point information of the entity information, or end point information of the entity information, or any combination thereof.

The automatic driving control apparatus may update a road link file to update the high-definition map. However, when updating pieces of information which does not need to change among pieces of information included in the road link file, the automatic driving control apparatus may increase capacity and time unnecessary to update a map. Therefore, the automatic driving control apparatus may be configured to determine the pieces of information included in the road link file into entity information, alignment information, and location information and may update only a file which needs to be updated among files respectively including the determined entity information, the determined alignment information, and the determined location information, rather than the road link file.

In S220, the automatic driving control apparatus may be configured to generate an entity road link file including the entity information, an alignment road link file including the alignment information, and a location road link file including the location information.

The entity road link file may include the entity information and a header indicating the entity information. For example, the header indicating the entity information may indicate an index about an entity at any point or location of the target section. Although described below, when only a portion of the entity information included in the entity road link file is corrected and/or changed, the automatic driving control apparatus may update only the portion.

The alignment road link file may include the alignment information and a header indicating the alignment information. For example, the header indicating the alignment information may indicate an index about a road alignment at any point or location of the target section. Although described below, when only a portion of the alignment information included in the alignment road link file is corrected and/or changed, the automatic driving control apparatus may update only the portion.

The location road link file may include the location information and a header indicating the location information. For example, the header indicating the location information may indicate an index about any point or location of the target section. Although described below, when only a portion of the location information included in the location road link file is corrected and/or changed, the automatic driving control apparatus may update only the portion.

The automatic driving control apparatus may be configured to determine and generate the road link file corresponding to the target section as an entity road link file corresponding to the target section, an alignment road link file corresponding to the target section, or a location road link file corresponding to the target section. In detail, the automatic driving control apparatus may be configured to determine the information included in the road link file corresponding to the target section as the entity information, the alignment information, or the location information to generate the entity road link file corresponding to the target section, the alignment road link file corresponding to the target section, and the location road link file corresponding to the target section.

The automatic driving control apparatus may be configured to generate the entity road link file, the alignment road link file, and the location road link file, based on the entity information, the alignment information, and the location information determined from the above-mentioned road link file. For example, the automatic driving control apparatus may be configured to generate an entity road link file including entity information among the piece of information included in the road link file corresponding to the target section and a header about the entity information. The automatic driving control apparatus may be configured to generate an alignment road link file including alignment information among the pieces of information included in the road link file corresponding to the target section and a header about the alignment information. The automatic driving control apparatus may be configured to generate a location road link file including location information among the pieces of information included in the road link file corresponding to the target section and a header about the location information. A detailed description of generating the entity road link file, the alignment road link file, and the location road link file based on the entity information, the alignment information, and the location information, which are determined, will be provided below with reference to FIG. 4.

In S230, the automatic driving control apparatus may compare pieces of information included in a server road link file which is stored in a server (e.g., a server 140 of FIG. 1) and corresponds to the target section with the pieces of information included in the road link file and may receive target information identified as being different from the pieces of information included in the road link file among the pieces of information included in the server road link file from the server.

The server road link file may indicate a road link file different from the road link file stored in the automatic driving control apparatus. Although described in detail below with reference to FIG. 5, the automatic driving control apparatus may receive only the target information in the server road link file and may replace extracted information with the target information.

The automatic driving control apparatus may compare the pieces of information included in the server road link file corresponding to the target section with the pieces of information included in the road link file. For example, the automatic driving control apparatus may compare the pieces of information included in the server road link file corresponding to the target section with information included in the entity road link file generated as the entity information included in the road link file is determined, information included in the alignment road link file generated as the alignment information included in the road link file is determined, and information included in the location road link file generated as the location information included in the road link file is determined.

The automatic driving control apparatus may perform the above-mentioned comparison operation to receive the target information identified as being different from the pieces of information included in the road link file among the pieces of information included in the server road link file from the server. For example, when entity information among the pieces of information included in the server road link file and the entity information among the pieces of information included in the road link file are different from each other, the automatic driving control apparatus may receive the entity information included in the server road link file as the target information from the server. However, various exemplary embodiments of the present disclosure are not limited thereto. When alignment information among the pieces of information included in the server road link file and the alignment information among the pieces of information included in the road link file are different from each other, the automatic driving control apparatus may receive the alignment information included in the server road link file as the target information from the server. Furthermore, when location information among the pieces of information included in the server road link file and the location information among the pieces of information included in the road link file are different from each other, the automatic driving control apparatus may receive the location information included in the server road link file as the target information from the server. A detailed description of receiving the target information in the automatic driving control apparatus from the server will be provided below with reference to FIG. 5.

In S240, the automatic driving control apparatus may recognize a header of the received target information and may update at least one of the entity road link file, the alignment road link file, or the location road link file, or any combination thereof.

The automatic driving control apparatus may recognize the header of the target information and may extract information corresponding to the recognized header among pieces of information included in at least one of the entity road link file, the alignment road link file, or the location road link file, or any combination thereof.

The header of the target information may indicate a header indicating the target information. However, the header of the target information is not limited thereto. The header of the target information may indicate an index about the target information at any point or location. For example, when the target information is the entity information, the header of the target information may be the same header as at least one of headers of the entity information stored in the automatic driving control apparatus. Otherwise, although the header of the target information is identical to the at least one of the headers of the entity information stored in the automatic driving control apparatus, the target information and entity information which is stored in the automatic driving control apparatus and is paired with the same header as the header of the target information may be the same as or different from each other.

As described above in S220, each of the entity road link file, the alignment road link file, and the location road link file may include a header. In detail, pieces of information included in each of the entity road link file, the alignment road link file, and the location road link file may be paired with headers corresponding to the pieces of information included in each of the files. A detailed description of pairing the pieces included in each of the files with the headers corresponding to the pieces of information will be provided below with reference to FIG. 4.

The automatic driving control apparatus may recognize the header of the target information and may compare the headers corresponding to the pieces of information included in at least one of the entity road link file, the alignment road link file, or the location road link file, or any combination thereof with the header of the recognized target information. The automatic driving control apparatus may extract the same header as the header of the recognized target information among the headers corresponding to the pieces of information included in the at least one of the entity road link file, the alignment road link file, or the location road link file, or the any combination thereof. The automatic driving control apparatus may update information corresponding to the header extracted from the at least one of the entity road link file, the alignment road link file, or the location road link file, or the any combination thereof to the target information. A detailed description of updating the information corresponding to the extracted header to the target information will be provided below with reference to FIG. 5.

Figure 3:
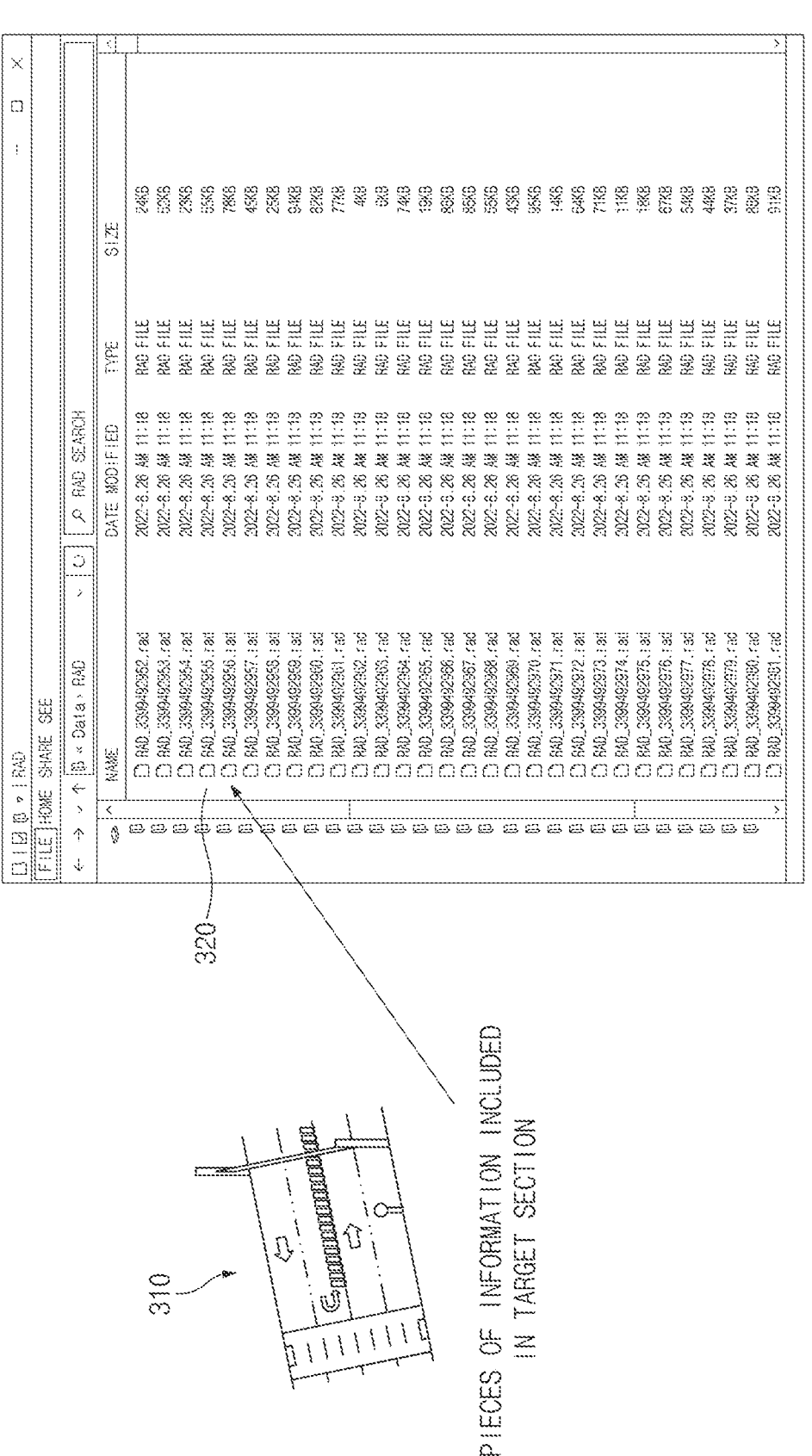
FIG. 3 is a drawing illustrating an example of a road link file management method for controlling automatic driving according to an exemplary embodiment of the present disclosure.

FIG. 3 is a drawing illustrating an example of a road link file management method for controlling a high-definition map according to an exemplary embodiment of the present disclosure.

Pieces of information 310 included in a target section may include guide sign information, speed sign information, median strip information, road direction information, crosswalk information, interpolation point information for expressing an alignment of the road, global positioning system (GPS) longitude and latitude information of entity information, start point information of the entity information, and end point information of the entity information.

A road link file 320 corresponding to the target section may include the pieces of information 310 included in the target section. The road link file 320 corresponding to the target section may be stored in a memory (e.g., a memory 120 of FIG. 1) in a form of a reality adlib tracker module (RAD) file.

An automatic driving control apparatus (e.g., an automatic driving control apparatus 100 of FIG. 1) may be configured to determine the pieces of information 310 included in the target section into entity information, alignment information, and location information. Furthermore, the automatic driving control apparatus may be configured to generate an entity road link file, an alignment road link file, and a location road link file, based on the entity information, the alignment information, and the location information determined from the road link file 320 corresponding to the target section.

To effectively control a high-definition map, the automatic driving control apparatus may more effectively control the entity road link file, the alignment road link file, and the location road link file to be maintained and/or changed, than maintaining and/or changing only the one road link file 320 corresponding to the target section. For example, when the alignment information among the pieces of information 310 included in the target section is changed and/or updated, the automatic driving control apparatus may change and/or update the road link file 320 corresponding to the target section. However, in the above-mentioned method (e.g., the method for changing and/or updating the road link file 320 corresponding to the target section), the remaining pieces of information (e.g., the entity information and the location information) as well as the alignment information which needs to be changed and/or updated among the pieces of information 310 included in the target section may be changed. Therefore, the automatic driving control apparatus may change and/or update only a file required for a change through the entity road link file, the alignment road link file, and the location road link file, thus more effectively controlling the high-definition map.

FIG. 4 is a drawing illustrating an example of determining entity information, alignment information, and location information for controlling a high-definition map according to an exemplary embodiment of the present disclosure.

An automatic driving control apparatus (e.g., an automatic driving control apparatus 100 of FIG. 1) may be configured to determine information 410 included in a target section road link file as section A road link information 420. In detail, the automatic driving control apparatus may be configured to determine the information 410 included in a section A road link file as entity information 422, alignment information 424, or location information 426.

For reference, the information 410 included in the section A road link file, which is shown in FIG. 4, may be expressed as information included in the road link file about section A for convenience of description, and section A may indicate a target section (e.g., the target section described above in S210). However, various exemplary embodiments of the present disclosure are not limited thereto. Section B or section C may also indicate a target section. When section A is the target section, road link information in a section different from the target section may include section B road link information 430 and section C road link information 440. On the other hand, when section B is the target section, road link information in a section different from the target section may include section A road link information 420 and section C road link information 440. Hereinafter, for convenience of description, section A is mainly referred to as the target section.

The entity information 422 determined from the information 410 included in the section A load link file may include guide sign information, speed sign information, median strip information, road direction information, and crosswalk information. In detail, the entity information 422 may include information related to entities included in a road corresponding to the target section and information with which a header indicating the entity information 422 is paired.

For example, the guide sign information may include information (e.g., an A12 guide sign) about the road corresponding the target section. The speed sign information may include speed limit information (e.g., an A11 speed sign) of the road corresponding to the target section. The median strip information may include information (e.g., an A8 median strip) about a median strip, included in the road corresponding to the target section, for separating roads (e.g., an upward road and a downward road) about different directions. The road direction information may include information (e.g., A1 straight mark 1) which is included the road corresponding to the target section and is about directions of the roads (e.g., the upward road and the downward road) about the different directions. The crosswalk information may include information (e.g., an A4 crosswalk mark) about a crosswalk included in the road corresponding to the target section.

The alignment information 424 determined from the information 410 included in the section A road link file may include interpolation point information for expressing an alignment of the road. In detail, the alignment information 424 may include information related to an alignment of the road corresponding to the target section and information with which a header indicating the alignment information 424 is paired.

For example, the interpolation point information for expressing the alignment of the road may include alignment information (e.g., A5.1 interpolation points 1, 2, 3, 4, and 5) about the road corresponding to the target section. The alignment information 424 may include interpolation point information of an entity (e.g., a line, a road boundary, or the like) about the alignment of the road in the entity information 422. In detail, "A5.1 interpolation points 1, 2, 3, 4, 5" in the alignment information 424 about the road corresponding to the target section may indicate interpolation point information of "A5 road boundary 1" included in the entity information 422. Furthermore, "A9.1 interpolation points 1, 2, 3, 4, 5" may indicate interpolation point information of "A9 line 2" included in the entity information 422.

The location information 426 determined from the information 410 included in the section A road link file may include global positioning system (GPS) longitude and latitude information of an entity included in the entity information 422, start point information of the entity included in the entity information 422, and end point information of the entity included in the entity information 422. In detail, the location information 426 may include information related to a location of an entity included in the road corresponding to the target section and information with which a header indicating the location information 426 is paired. For example, "A.0.1 location value of each edge" in the location information 426 about the road corresponding to the target section may indicate location information of "A1 straight mark 1" included in the entity information 422.

The automatic driving control apparatus may be configured to generate an entity road link file including the entity information 422, an alignment road link file including the alignment information 424, and a location road link file including the location information 426, based on determining the information 410 included in the section A road link file as the entity information 422, the alignment information 424, or the location information 426. Hereinafter, a method for updating the entity road link file, the alignment road link file, and the location road link file in the automatic driving control apparatus will be described below with reference to FIG. 5.

Figure 5:
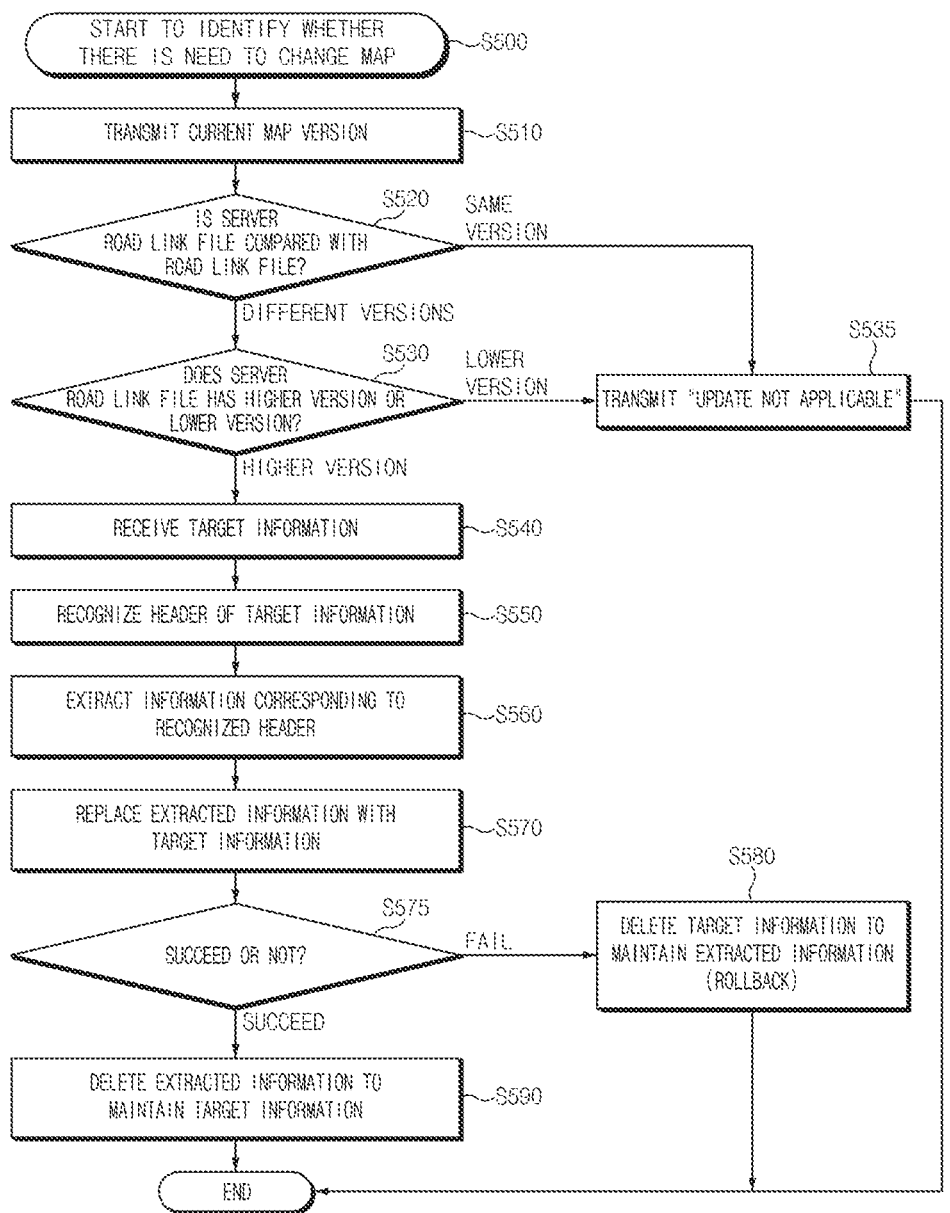
FIG. 5 is a flowchart for describing an update of at least one of an entity road link file, an alignment road link file, or a location road link file, or any combination thereof for controlling automatic driving according to an exemplary embodiment of the present disclosure.

FIG. 5 is a flowchart for describing an update of at least one of an entity road link file, an alignment road link file, or a location road link file, or any combination thereof for controlling a high-definition map according to an exemplary embodiment of the present disclosure.

In S500, an automatic driving control apparatus (e.g., an automatic driving control apparatus 100 of FIG. 1) may start to identify whether there is a need to change a map. For example, the high-definition map control screen may start to identify update progress for a unit section map which needs to change among unit section maps included in a high-definition map.

In S510, the automatic driving control apparatus may transmit a current map version to a server (e.g., a server 140 of FIG. 1).

A current time point may indicate a time point when the automatic driving control apparatus identifies whether there is a need to change a map. For example, the current time point may include a time point when the automatic driving control apparatus identifies whether there is a need to change or update a unit section map which needs to change among the unit section maps included in the high-definition map.

The current map version may indicate versions of road link files included in the automatic driving control apparatus. For example, the current map version may include versions of an entity road link file, an alignment road link file, and a location road link file, which are determined from the road link file.

In S520, the automatic driving control apparatus may compare a server load link file (e.g., a server load link file in S220 of FIG. 2) with the road link file transmitted in S510. When the versions are identical to each other, in S535, the automatic driving control apparatus may transmit "update not applicable". Otherwise, the automatic driving control apparatus may compare the server road link file with the road link file transmitted in S510 and may perform a next operation, when the versions are different from each other.

In S530, the automatic driving control apparatus may compare the server road link file with the road link file transmitted in S510, when the server road link file includes a lower version, in S535, the automatic driving control apparatus may transmit "update not applicable". Otherwise, the automatic driving control apparatus may compare the server road link file with the road link file transmitted in S510 and may perform next operations, when the server road link file includes a higher version.

In S540, the automatic driving control apparatus may compare pieces of information included in the server road link file, which is stored in the server and corresponds to the target section, with information included in the road link file and may receive target information identified as being different from the information included in the road link file among the pieces of information included in the server road link file from the server.

In S550, the automatic driving control apparatus may recognize a header of the received target information. For example, the header of the received target information may indicate the same header as a header of information to be updated in at least one of entity information, alignment information, or location information, or any combination thereof by the automatic driving control apparatus. The automatic driving control apparatus may be configured to determine whether the target information corresponds to any of the entity information, the alignment information, or the location information, based on the recognized header.

For example, when the format of the recognized header is a combination (e.g., A5 of FIG. 4) of an English letter and a single number, the automatic driving control apparatus may be configured to determine that the target information corresponds to entity information (e.g., entity information 422 of FIG. 4). When the format of the recognized header is a combination (e.g., A5.1 of FIG. 4) of an English letter and a number divided into two types, the automatic driving control apparatus may be configured to determine that the target information corresponds to alignment information (e.g., alignment information 424 of FIG. 4). When the format of the recognized header is a combination (e.g., A5.1.1 of FIG. 4) of an English letter and a number divided into three types, the automatic driving control apparatus may be configured to determine that the target information corresponds to location information (e.g., location information 426 of FIG. 4). However, the format of the header is not limited thereto. For convenience of description in the specification, the format of the header is mainly referred to as a format which is a combination of an English letter, a number, and an identifier (e.g., it is illustrated as "," in FIG. 4).

In S560, the automatic driving control apparatus may recognize the header of the target information and may extract information corresponding to the recognized header among pieces of information included in at least one of an entity road link file, an alignment road link file, or a location road link file, or any combination thereof. For example, the extracted information may indicate information to be replaced with the target information, which includes a lower version than the target information received from the server.

In S570, the automatic driving control apparatus may replace the extracted information with the target information. For example, the automatic driving control apparatus may replace the extracted information with the target information, in at least one of the entity road link file, the alignment road link file, or the location road link file, or the any combination thereof.

When failing to replace the extracted information with the target information in S575, in S580, the automatic driving control apparatus may delete the target information to maintain the extracted information. In detail, when failing to replace the extracted information with the target information, the automatic driving control apparatus may perform rollback for maintaining the extracted information.

When succeeding to replace the extracted information with the target information in S575, in S590, the automatic driving control apparatus may delete the extracted information to maintain the target information.

Figure 6:
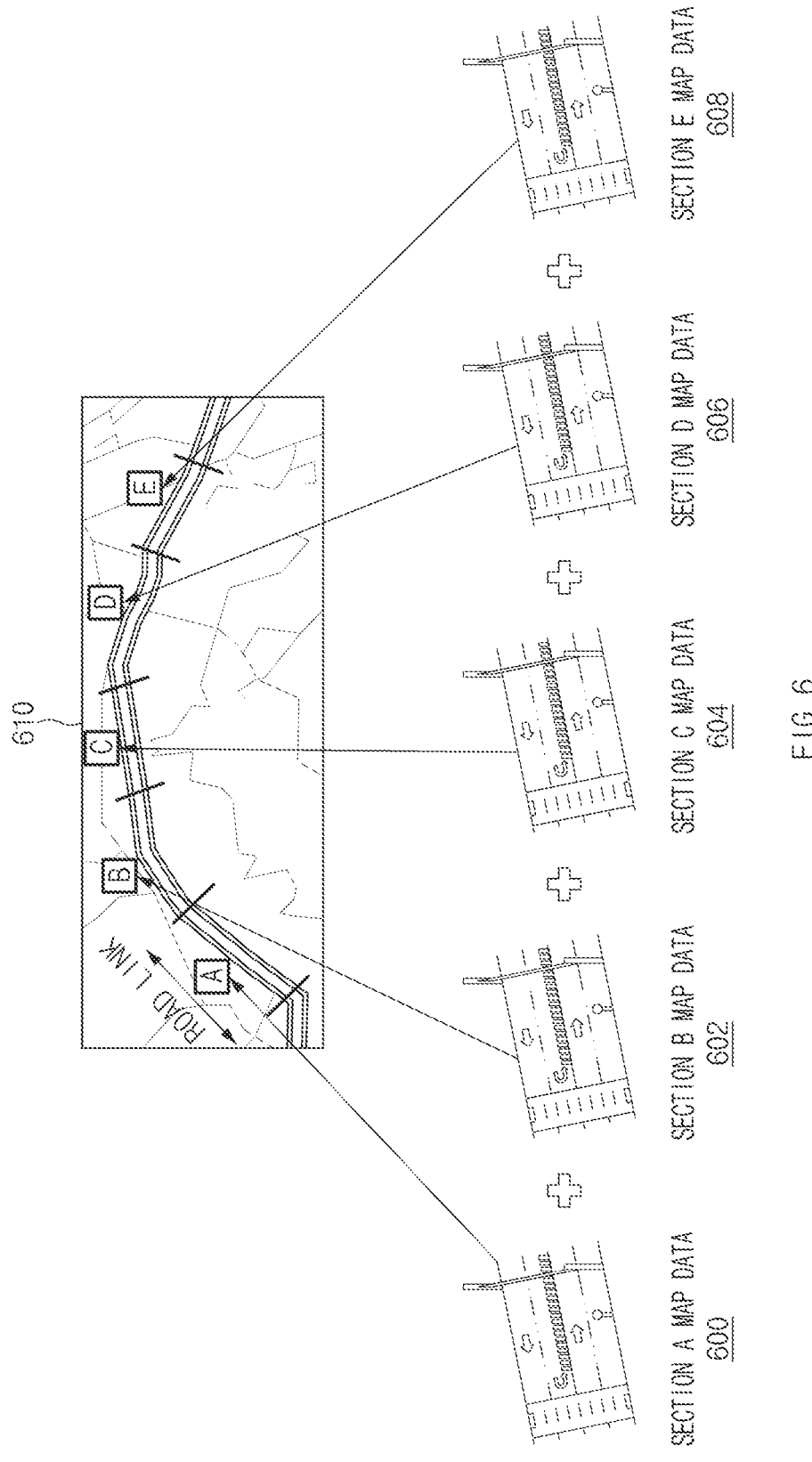
FIG. 6 is a drawing illustrating an example of generating high-definition map data based on generated map data for controlling automatic driving according to an exemplary embodiment of the present disclosure.

FIG. 6 is a drawing illustrating an example of generating high-definition map data based on generated map data for controlling a high-definition map according to an exemplary embodiment of the present disclosure.

An automatic driving control apparatus (e.g., an automatic driving control apparatus 100 of FIG. 1) may be configured to generate high-definition map data, based on map data 600 of a target section and map data 602, 604, 606, and 608 of sections different from the target section. The automatic driving control apparatus may be configured to generate a high-definition map 610, based on the generated high-definition map data. The map data 600 of the target section may indicate pieces of information included in target section road link files. Furthermore, the map data 602, 604, 606, and 608 of the sections different from the target section may indicate pieces of information included in road link files of the sections different from the target section. For reference, for convenience of description in the specification, it is mainly described that section A is the target section and the remaining sections B to E are the sections different from the target section.

The automatic driving control apparatus may call headers of pieces of information included in each of an entity road link file, an alignment road link file, and a location road link file and may be configured to generate the map data 600 of the target section, based on the called headers. For example, the automatic driving control apparatus may call headers paired with the pieces of information included in each of the entity road link file, the alignment road link file, and the location road link file and may be configured to generate the map data 600 of the target section, based on the pieces of information paired with the called headers. The map data 600 of the target section may indicate data about a first section including a predetermined length in the entire road section indicating the high-definition map 610. The first section may indicate section an in the high-definition map 610 shown in FIG. 6.

The automatic driving control apparatus may call headers of pieces of information included in each of an entity road link file, an alignment road link file, and a location road link file of each of sections different from the above-mentioned target section and may be configured to generate the map data 602, 604, 606, and 608 of the sections different from the above-mentioned target section, based on the called headers. For example, the map data 602, 604, 606, and 608 of the sections different from the target section may indicate data about a second section which is different from the above-mentioned first section in the entire road section indicating the high-definition map 610 and includes a predetermined length. The second section may indicate at least one of section B, section C, section D, or section E in the high-definition map 610 shown in FIG. 6.

For reference, for convenience of description in the specification, the first section and the second section are mainly referred to as sections necessary for a vehicle using the high-definition map to perform autonomous driving, but not limited thereto. The first section and the second section may indicate sections necessary for the vehicle using a navigation map or an advanced driver assistance system (ADAS) map to travel.

The automatic driving control apparatus may connect the map data 600 of the target section with the map data 602, 604, 606, and 608 of the sections different from the target section in order (e.g., in an order of section A, section B, section C, section D, and section E) to generate the high-definition map 610.

Figure 7:
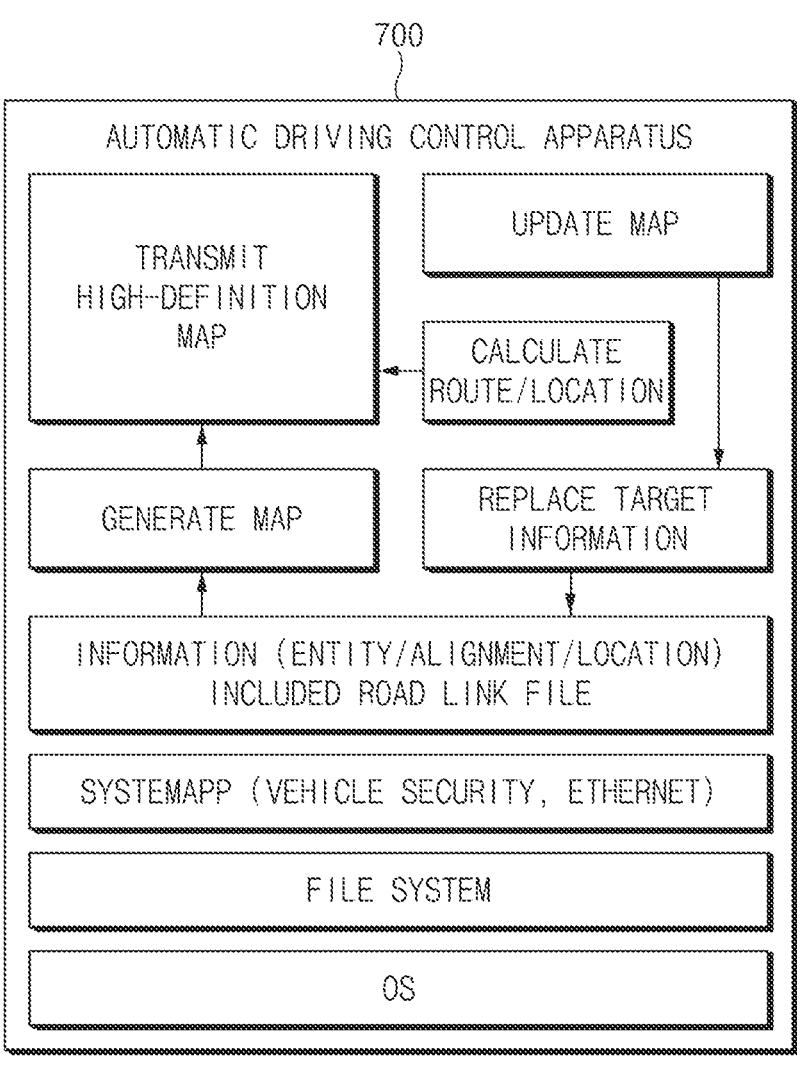
FIG. 7 is a drawing illustrating detailed components of an automatic driving control apparatus according to an exemplary embodiment of the present disclosure.

FIG. 7 is a drawing illustrating detailed components of an automatic driving control apparatus according to an exemplary embodiment of the present disclosure.

An automatic driving control apparatus 700 may include at least one processor. For example, the automatic driving control apparatus 700 may include a map update processor, a processor for determining a route and a location of a vehicle, a target information replacement processor, a processor for determining information included in a road link file, a map generation processor, and a high-definition map transmission processor.

For example, the map update processor may be a processor which is configured to perform an operation (e.g., S500 of FIG. 5) of starting to identify whether there is a need to change a map. The processor for determining the route and the location of the vehicle may be a processor which is configured to determine a current route and a current location of the vehicle in a high-definition map. For example, the target information replacement processor may be a processor which is configured to perform an operation (e.g., S570 of FIG. 5) of replacing extracted information with target information, in at least one of an entity road link file, an alignment road link file, or a location road link file, or any combination thereof. The processor for determining the information included in the road link file may be configured to determine information included in a target section road link file (e.g., information 410 included in a target section road link file in FIG. 4) as section A road link information (e.g., section A road link information 420 of FIG. 4) and may be configured to determine the information included in the target section road link file as entity information (e.g., entity information 422 of FIG. 4), alignment information (e.g., alignment information 424 of FIG. 4), or location information (e.g., location information 426 of FIG. 4). The map generation processor may be a processor which generates high-definition map data, based on map data of a target section (e.g., map data 600 of a target section in FIG. 6) and map data of sections different from the target section (e.g., map data 602, 604, 606, and 608 of sections different from the target section in FIG. 6). The high-definition map transmission processor may be a processor which transmits a high-definition map (e.g., a high-definition map 610 of FIG. 6) generated based on the high-definition map data to a user through the vehicle.

Figure 8:
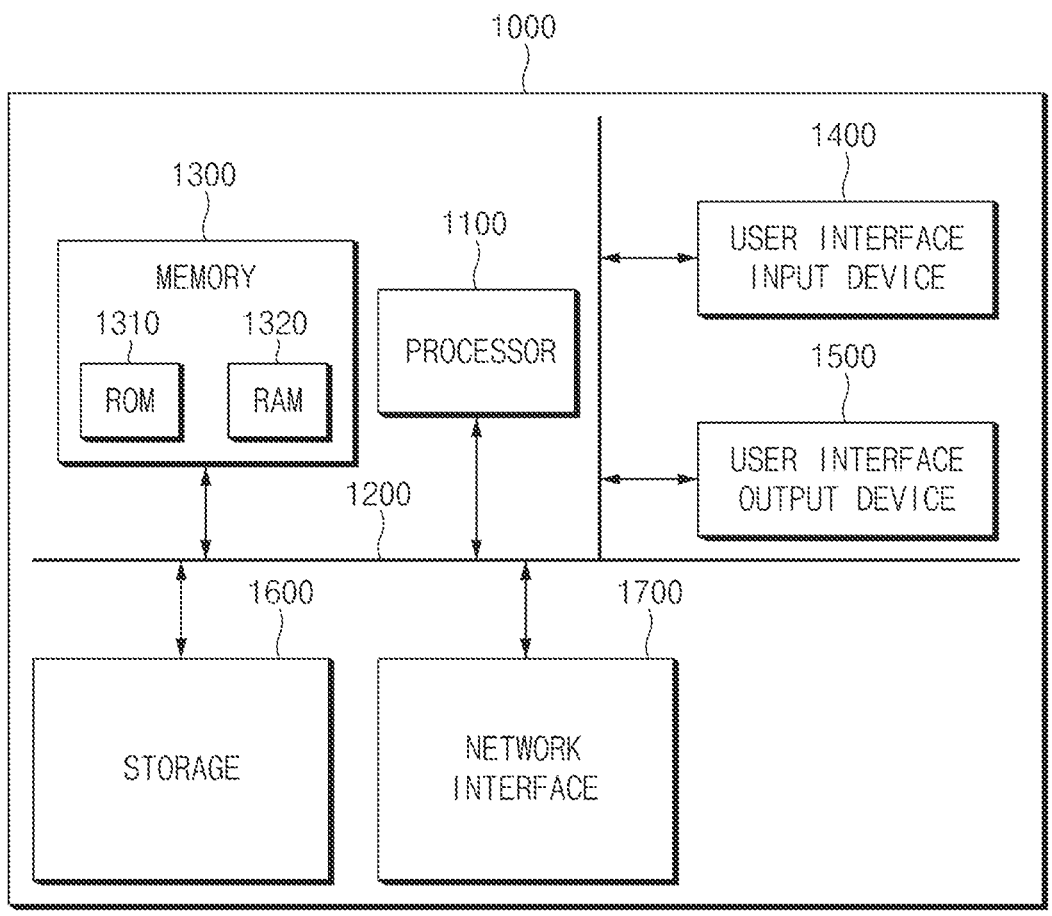
FIG. 8 illustrates a computing system according to an exemplary embodiment of the present disclosure.

FIG. 8 illustrates a computing system according to an exemplary embodiment of the present disclosure.

Referring to FIG. 8, a computing system 1000 about an automatic driving control method may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the operations of the method or algorithm described in connection with the exemplary embodiments included in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The above-described embodiments may be implemented with hardware elements, software elements, and/or a combination of hardware elements and software elements. For example, the devices, methods, and components described in the exemplary embodiments of the present disclosure may be implemented using general-use computers or special-purpose computers, such as a processor, a controller, an arithmetic logic unit (ALU), a digital signal processor, a microcomputer, a field programmable array (FPGA), a programmable logic unit (PLU), a microprocessor, or any device which may execute instructions and respond. A processing unit may perform an operating system (OS) or a software application running on the OS. Furthermore, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may include a different processing configuration, such as a parallel processor.

Software may include computer programs, codes, instructions or one or more combinations thereof and may configure a processing unit to operate in a desired manner or may independently or collectively instruct the processing unit. Software and/or data may be permanently or temporarily embodied in any type of machine, components, physical equipment, virtual equipment, computer storage media or units or transmitted signal waves to be interpreted by the processing unit or to provide instructions or data to the processing unit. Software may be dispersed throughout computer systems connected via networks and may be stored or executed in a dispersion manner. Software and data may be recorded in one computer-readable storage media.

The methods according to various exemplary embodiments of the present disclosure may be implemented in a form of program instructions which may be executed through various computer means and may be recorded in computer-readable media. The computer-readable media may include program instructions, data files, data structures, and the like alone or in combination, and the program instructions recorded on the media may be specially designed and configured for an example or may be known and usable to those skilled in the art of computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes which may be executed by the computer using an interpreter.

The above-described hardware devices may be configured to act as one or a plurality of software modules to perform the operations of the embodiments, or vice versa.

Even though the exemplary embodiments are described with reference to restricted drawings, it may be obviously to one skilled in the art that the exemplary embodiments are variously changed or modified based on the above description. For example, adequate effects may be achieved even if the foregoing processes and methods are conducted in different order than described above, and/or the aforementioned elements, such as systems, structures, devices, or circuits, are combined or coupled in different forms and modes than as described above or be substituted or switched with other components or equivalents.

A description will be provided of effects of the automatic driving control apparatus and the method thereof according to an exemplary embodiment of the present disclosure.

According to at least one of embodiments of the present disclosure, the automatic driving control apparatus may be configured to determine information included in a road link file corresponding to a target section as entity information, alignment information, or location information and may be configured to generate an entity road link file including the entity information, an alignment road link file including the alignment information, and a location road link file including the location information.

Furthermore, according to at least one of embodiments of the present disclosure, the automatic driving control apparatus may compare pieces of information included in a server road link file which is stored in a server and corresponds to the target section with the information included in the road link file and may receive target information identified as being different from the information included in the road link file among the pieces of information included in the server road link file from the server.

Furthermore, according to at least one of embodiments of the present disclosure, the automatic driving control apparatus may recognize a header of the received target information and update at least one of the entity road link file, the alignment road link file, or the location road link file, or any combination thereof.

Furthermore, according to at least one of embodiments of the present disclosure, the automatic driving control apparatus may call headers of pieces of information included in the target section and a section different from the target section and may be configured to generate map data based on the called headers, thus generating high-definition map data.

Furthermore, various effects ascertained directly or indirectly through the present disclosure may be provided.

Therefore, other implements, other embodiments, and equivalents to claims are within the scope of the following claims.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An automatic driving control apparatus, comprising:
a memory storing computer-executable instructions;
a communication device configured to assist in communicating with a server; and
at least one processor operatively connected to the memory and the communication device and configured to access the memory and execute the instructions,
wherein the at least one processor is configured to:
transmit, to the server, version information of a road link file corresponding to a target section, wherein the version information of the road link file includes version information of at least one of entity information, alignment information, or location information included in the road link file,
based on the version information, receive from the server, target information that differs from the information included in the road link file, among information included in a server road link file stored in the server and corresponding to the target section, based on a header of the target information, determine at least one type corresponding to the target information, the at least one type corresponding to at least one of the entity information, the alignment information, or the location information, update the road link file by replacing, in the road link file, information corresponding to the determined at least one type with the target information, and control a vehicle based on updating the road link file.

2. The automatic driving control apparatus of claim 1, wherein the entity information includes a combination of at least one of guide sign information, speed sign information, median strip information, road direction information, or crosswalk information, or any combination thereof.

3. The automatic driving control apparatus of claim 1, wherein the alignment information includes interpolation point information for expressing an alignment of a road.

4. The automatic driving control apparatus of claim 1, wherein the location information includes at least one of global positioning system (GPS) longitude and latitude information of the entity information, start point information of the entity information, or end point information of the entity information, or any combination thereof.

5. The automatic driving control apparatus of claim 1, wherein the at least one processor generates an entity road link file including the entity information, an alignment road link file including the alignment information, and a location road link file including the location information and recognizes the header of the received target information and updates at least one of the entity road link file, the alignment road link file, or the location road link file, or any combination thereof.

6. The automatic driving control apparatus of claim 5, wherein the at least one processor recognizes the header of the target information and extracts information corresponding to the recognized header among pieces of information included in the at least one of the entity road link file, the alignment road link file, or the location road link file, or the any combination thereof and replaces the extracted information with the target information in the at least one of the entity road link file, the alignment road link file, or the location road link file, or the any combination thereof.

7. The automatic driving control apparatus of claim 6, wherein the at least one processor is further configured to delete the extracted information from the automatic driving control apparatus, on a basis that the extracted information is replaced with the target information.

8. The automatic driving control apparatus of claim 6, wherein the at least one processor is further configured to delete the target information from the automatic driving control apparatus, on a basis that the extracted information is not replaced with the target information.

9. The automatic driving control apparatus of claim 5, wherein the at least one processor calls headers of pieces of information included in each of the entity road link file, the alignment road link file, and the location road link file and generates map data of the target section, based on the called headers.

10. The automatic driving control apparatus of claim 9, wherein the at least one processor calls headers of pieces of information included in each of an entity road link file, an alignment road link file, and a location road link file of a section different from the target section, generates map data of the section different from the target section, based on the called headers, and generates high-definition map data, based on the map data of the target section and the map data of the section different from the target section.

11. An automatic driving control method, comprising:

transmitting, by at least one processor, to a server, version information of a road link file corresponding to a target section, wherein the version information of the road link file includes version information of at least one of entity information, alignment information, or location information included in the road link file;

based on the version information, receiving, by the at least one processor, from the server, target information that differs from the information included in the road link file, among information included in a server road link file stored in the server and corresponding to the target section;

based on a header of the target information, determining, by the at least one processor, at least one type corresponding to the target information, the at least one type corresponding to at least one of the entity information, the alignment information, or the location information;

updating, by the at least one processor, the road link file by replacing, in the road link file, information corresponding to the determined at least one type with the target information; and controlling, by the at least one processor, a vehicle based on updating the road link file.

12. The automatic driving control method of claim 11, wherein the entity information includes a combination of at least one of guide sign information, speed sign information, median strip information, road direction information, or crosswalk information, or any combination thereof.

13. The automatic driving control method of claim 11, wherein the alignment information includes interpolation point information for expressing an alignment of a road.

14. The automatic driving control method of claim 11, wherein the location information includes at least one of global positioning system (GPS) longitude and latitude information of the entity information, start point information of the entity information, or end point information of the entity information, or any combination thereof.

15. The automatic driving control method of claim 11, further including:

generating, by the at least one processor, an entity road link file including the entity information, an alignment road link file including the alignment information, a location road link file including the location information; and recognizing, by the at least one processor, the header of the received target information and updating at least one of the entity road link file, the alignment road link file, or the location road link file, or any combination thereof.

16. The automatic driving control method of claim 15, wherein the updating includes:

recognizing the header of the target information and extracting information corresponding to the recognized header among pieces of information included in the at least one of the entity road link file, the alignment road link file, or the location road link file, or the any combination thereof; and replacing the extracted information with the target information in the at least one of the entity road link file, the alignment road link file, or the location road link file, or the any combination thereof.

17. The automatic driving control method of claim 16, wherein the updating further includes:

deleting the extracted information from an automatic driving control apparatus, on a basis that the extracted information is replaced with the target information.

18. The automatic driving control method of claim 16, wherein the updating further includes:

deleting the target information from an automatic driving control apparatus, on a basis that the extracted information is not replaced with the target information.

19. The automatic driving control method of claim 15, further including:

calling headers of pieces of information included in each of the entity road link file, the alignment road link file, and the location road link file; and generating map data of the target section, based on the called headers.

20. The automatic driving control method of claim 19, further including:

calling headers of pieces of information included in each of an entity road link file, an alignment road link file, and a location road link file of a section different from the target section;

generating map data of the section different from the target section, based on the called headers; and generating high-definition map data, based on the map data of the target section and the map data of the section different from the target section.

* * * * *